H. JACOB.
STEREOTELESCOPE.
APPLICATION FILED JULY 24, 1906.
972,622.
Patented Oct. 11, 1910.
2 SHEETS—SHEET 1.
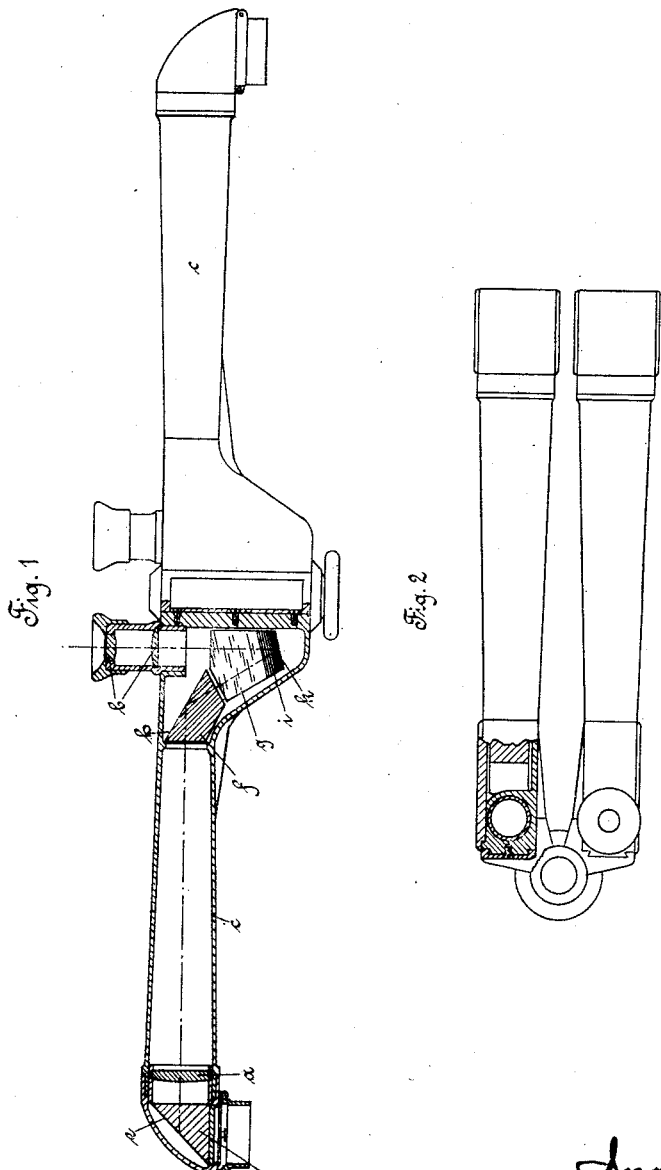

H. JACOB.
STEREOTELESCOPE.
APPLICATION FILED JULY 24, 1906.
972,622.
Patented Oct. 11, 1910.
2 SHEETS—SHEET 2.
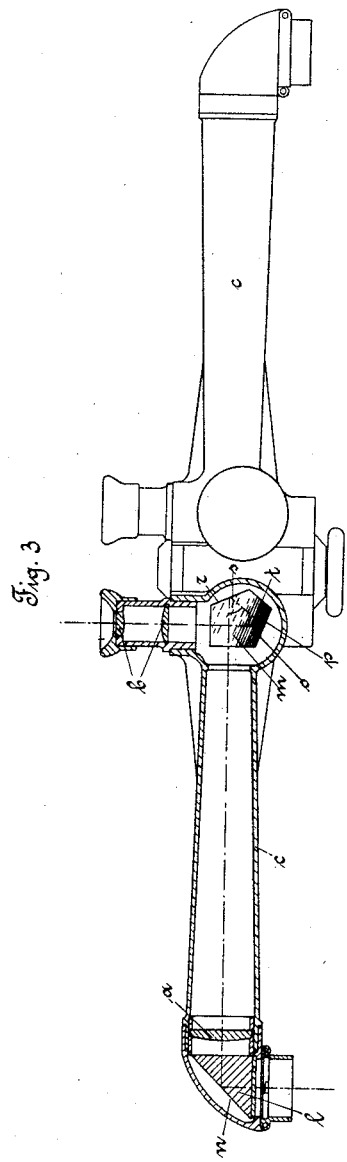
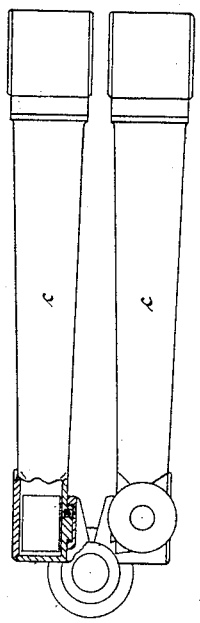
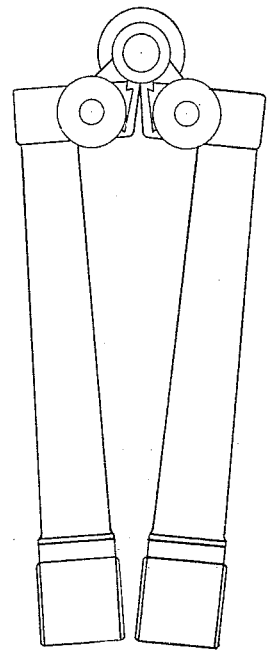

UNITED STATES PATENT OFFICE.

HEINRICH JACOB, OF FRIEDENAU, NEAR BERLIN, GERMANY, ASSIGNOR TO THE FIRM OF OPTISCHE ANSTALT C. P. GOERZ AKTIENGESELLSCHAFT, OF FRIEDENAU, NEAR BERLIN, GERMANY.

STEREOTELESCOPE.

972,622.  Specification of Letters Patent.  Patented Oct. 11, 1910.

Application filed July 24, 1906. Serial No. 327,573.

*To all whom it may concern:*

Be it known that I, HEINRICH JACOB, a citizen of the German Empire, and resident of Friedenau, near Berlin, Germany, engineer, have invented certain new and useful Improvements in Stereotelescopes, of which the following is a specification.

My invention relates to improvements in stereo-telescopes, that is to say in double-telescopes the objective lenses of which are farther apart than the ocular lenses.

The purpose of the present invention is to reduce the bulk of the instrument especially when folded.

The invention is illustrated in the annexed drawings by means of two examples.

Figures 1 and 2 show respectively a plan-view and an elevation of one embodiment of the invention: Figs. 3 and 4 show likewise a plan-view and an elevation of a modified form of a stereo-telescope in accordance with the invention; and Fig. 5 illustrates a folded instrument of known construction with a system of Porro prisms.

Referring to Figs. 1 and 2, $a$ is one of the objective lenses, the two lenses forming the corresponding ocular system being indicated by $b$. The two transverse tubes are marked $c$. In front of the lens $a$ there is arranged a reflecting prism $d$ representing in cross-section a right-angled isosceles triangle. The reflecting surface of the prism $d$ is marked $e$. $f$ and $g$ are the other prisms belonging to the reversing system; the reflecting surface of the prism $f$ is marked $h$, and $i$ indicates a dihedral portion of the prism $g$. The path of the axial ray traversing the left-hand member of the double telescope is indicated in Fig. 1. It will be seen that the prism-chamber can be made comparatively narrow, since the rays traversing the instrument are symmetrically distributed with regard to the edge $k$ of the dihedron $i$. The advantage thus secured is very clearly shown by a comparison of Fig. 2 with Fig. 5. At the same time the construction allows a large distance of the objective and the ocular and consequently a high stereoscopic effect without materially increasing the bulk of the instrument because for this purpose it is only necessary to elongate tubes $c$ and to enlarge the distance between prisms $d$ and $f$.

In the construction illustrated in Figs. 3 and 4 the objective and ocular lenses of one member of the telescope are again indicated by $a$ and $b$ respectively, the transverse tubes of the instrument being marked $c$. The reversing system comprises a prism $l$, representing in section a right-angled isosceles triangle, and a so-called penta-hedral prism $m$ which also is right-angled and so positioned that one of the surfaces including the right angle is turned toward the right-angled triangular prism and the other toward the ocular. $n$ is the reflecting surface of the prism $l$, and $o$ is a dihedral portion of the prism $m$, with an edge $p$. $i$ is the silver-coated surface of the prism $m$. The path of the axial ray traversing the left-hand member of the telescope is indicated in Fig. 3. The penta-hedral prism $m$ differs slightly in shape from the ordinary penta-hedral prisms, as is indicated by the path of the ray, since the angles $s$ and $t$ of the said path, where the ray meets the surface $r$ and the edge $p$ respectively, are not equal, the angle $s$ being larger than the angle $t$. With this construction of the prism $m$ the latter projects to a less extent toward the central plane of the instrument than would be the case with a penta-hedral prism of the ordinary shape, in which the angles $s$ and $t$ are equal.

Having now particularly described and ascertained the nature of my said invention and in what manner the same is to be performed, I declare that what I claim is:—

1. A stereo-telescope comprising two telescope-members which are adapted to be folded together, each of which includes an objective system and an ocular system out of alinement with one another, and is provided with a system of reversing prisms, one element of which is formed by a right-angled triangular prism, each system having two surfaces forming a di-hedron, forming a reflecting surface before the ocular, the edge of which is intersected by the ocular axis and two further reflecting surfaces one of which is formed by the hypotenuse surface of said right-angled triangular prism which is that surface first met by the rays entering the instrument and so arranged that the rays are reflected by same in a direction perpendicular to the joint and ocular axis, whereas the second surface which reflects the rays meeting it to said di-hedron forming surfaces is inclined to the direction of vision and positioned in close proximity to the dihedral surfaces.

2. A stereo-telescope comprising two telescope-members which are adapted to be folded together, each of which includes an objective system and an ocular system not in alinement with one another, and is provided with a system of reversing prisms, each system comprising a right-angled triangular prism and a rectangular pentahedral prism, the prisms arranged in such a manner that the hypotenuse surface of the triangular prism receives the rays on entering the instrument and reflects same in a direction perpendicular to the joint and ocular axis to the penta-hedral prism, the latter being so positioned and constructed that one of the surfaces including the right angle is directed toward the triangular prism and the other toward the ocular, whereas the silver-coated reflecting surface of the prism is arranged opposite the first named surface with such inclination with relation to same and to the edge of the dihedral surfaces that the angle between the incident and the reflected ray made by the axial ray where it impinges on the silver-coated surface of the penta-hedral prism is larger than the angle between incident and reflected ray made by said ray where it impinges on the ocular axis intersecting edge of the di-hedron.

In testimony whereof I have signed this specification in the presence of two subscribing witnesses.

HEINRICH JACOB.

Witnesses:
  HENRY HASPER,
  WOLDEMAR HAUPT.